United States Patent
Staghøj et al.

(10) Patent No.: US 9,564,786 B2
(45) Date of Patent: Feb. 7, 2017

(54) WIND TURBINE GENERATOR WITH FLUID FILM BEARING UNITS

(75) Inventors: Michael Staghøj, Ry (DK); Gerner Larsen, Hinnerup (DK); Niels Christian Olsen, Tjele (DK); Frank Møller Hansen, Aalborg (DK); Jörg Wadehn, Trige (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 13/978,312

(22) PCT Filed: Jan. 5, 2011

(86) PCT No.: PCT/EP2011/050081
§ 371 (c)(1),
(2), (4) Date: Jul. 3, 2013

(87) PCT Pub. No.: WO2012/092963
PCT Pub. Date: Jul. 12, 2012

(65) Prior Publication Data
US 2013/0277986 A1    Oct. 24, 2013

(51) Int. Cl.
*F03D 9/00* (2016.01)
*H02P 9/04* (2006.01)
(Continued)

(52) U.S. Cl.
CPC .............. *H02K 7/183* (2013.01); *F03D 9/002* (2013.01); *F03D 80/70* (2016.05);
(Continued)

(58) Field of Classification Search
CPC ......... H02K 7/183; H02K 21/02; F03D 80/70; F03D 9/002; F16C 32/0603; F16C 32/0622
(Continued)

(56) References Cited

U.S. PATENT DOCUMENTS 3,482,232 A * 12/1969 Farrand et al. ............ 360/234.6

FOREIGN PATENT DOCUMENTS

DE    1942054 A1    3/1971
DE    10255745 A1    6/2004
(Continued)

OTHER PUBLICATIONS

Machine translation of DE 1942054 obtained via Espacenet.*
(Continued)

*Primary Examiner* — Tulsidas C Patel
*Assistant Examiner* — Thomas Quigley
(74) *Attorney, Agent, or Firm* — Wood Herron & Evans LLP

(57) ABSTRACT

A generator for a wind turbine is disclosed. The generator comprises a rotor configured to rotate about a rotational axis, and at least one stator arranged next to the rotor. Each stator comprises at least one flux-generating module facing the rotor but spaced therefrom, thereby forming an air gap between the rotor and each flux-generating module. Each stator also comprises at least one bearing unit, each bearing unit comprising a body defining a cavity with an open end facing the rotor. The generator further comprises a source of pressurized fluid communicating with each bearing unit, and the body of each bearing unit directs the fluid towards the rotor to help maintain the air gap between the rotor and each flux-generating module. Thereby the air gap between the rotor and the flux-generating modules is controlled by means of the fluid bearing units. The invention further provides a wind turbine comprising such a generator.

17 Claims, 6 Drawing Sheets

(51) Int. Cl.
*H02K 7/18* (2006.01)
*F16C 32/06* (2006.01)
*H02K 21/02* (2006.01)

(52) U.S. Cl.
CPC ...... *F16C 32/0603* (2013.01); *F16C 32/0622* (2013.01); *H02K 21/02* (2013.01); *F05B 2220/7066* (2013.01); *F05B 2240/53* (2013.01); *Y02E 10/722* (2013.01); *Y02E 10/725* (2013.01)

(58) Field of Classification Search
USPC ..................................................... 290/44, 55
See application file for complete search history.

(56) References Cited

FOREIGN PATENT DOCUMENTS

| KR | 100969682 B1 * | 7/2010 | ............. F03D 9/002 |
|---|---|---|---|
| KR | 100969682 B1 | 7/2010 | |
| WO | 2009071843 A2 | 6/2009 | |

OTHER PUBLICATIONS

Machine translation of DE 10255745 obtained via Espacenet.*
Machine translation of KR 100969682 obtained via KIPRIS.*
International Searching Authority, Search Report and Written Opinion issued in corresponding PCT/EP2011/050081, 12 pages.
European Patent Office, Official Action issued in Application No. 11 700 019.0 dated Aug. 26, 2015.
European Patent Office, Official Action issued in Application No. 11 700 019.0 dated Mar. 3, 2016.
Anonymous: "Fluid bearing—Wikipedia, the free encyclopedia", Jan. 7, 2016, XP055253016, Retrieved from the Internet: URL:https://en.wikipedia.org/w/index.php?title=Fluid_bearing&printable=yes [retrieved on Feb. 24, 2016].

* cited by examiner

WIND TURBINE GENERATOR WITH FLUID FILM BEARING UNITS

FIELD OF THE INVENTION

The present invention relates to a generator for a wind turbine. The generator of the invention allows an air gap between a rotor and a stator of the generator to be controlled accurately, even for large diameter rotors and stators. The present invention further relates to a wind turbine comprising such a generator.

BACKGROUND OF THE INVENTION

Generators normally comprise a rotor and a stator, the rotor being arranged rotatably relative to the stator with a small air gap there between. It is necessary to achieve and maintain a high precision in the air gap between the rotor and the stator since the air gap, also for very large generators, has to be quite small, and generally only a few millimetres. To this end the rotor and the stator have previously been designed very rigid and heavy.

Some manufacturers have attempted to overcome these design challenges by mounting roller elements to the stator. The roller elements help maintain the air gap so that the rotor and stator do not need to be as rigid and heavy. Despite these solutions, there remains significant room for improvement.

SUMMARY OF THE INVENTION

It is an object of embodiments of the invention to provide a generator for a wind turbine in which the size of an air gap between rotor and stators can be easily controlled.

It is a further object of embodiments of the invention to provide a wind turbine comprising a generator in which the size of an air gap between rotor and stators can be easily controlled.

According to a first aspect the invention provides a generator for a wind turbine, the generator comprising:
- a rotor configured to rotate about a rotational axis,
- at least one stator arranged next to the rotor, each stator comprising at least one flux-generating module facing the rotor but spaced therefrom, thereby forming an air gap between the rotor and each flux-generating module, and at least one bearing unit, each bearing unit comprising a body defining a cavity with an open end facing the rotor, and
- a source of pressurized fluid communicating with each bearing unit, wherein the body of each bearing unit directs the fluid towards the rotor to help maintain the air gap between the rotor and each flux-generating module.

The rotor is configured to rotate about a rotational axis, and the stator(s) is/are arranged next to the rotor. Accordingly, when the rotor rotates about the rotational axis, it performs rotational movements relative to the stator(s), and thereby relative to the flux-generating modules. This relative movement causes electrical energy to be produced by the generator.

The flux-generating modules are arranged in such a manner that they face the rotor, but are spaced therefrom. This forms an air gap between the rotor and the flux-generating modules. The rotor and the flux-generating modules of the stator include permanent magnets, electromagnetic windings, combinations thereof, or other active materials configured to provide a magnetic flux across the air gap sufficient to generate electricity.

Each stator comprises at least one bearing unit, and each bearing unit comprises a body defining a cavity with an open end facing the rotor. Thereby the open end of the cavity of a given bearing unit forms an interface between this bearing unit and the rotor. The bearing units support the rotor during rotational movements of the rotor relative to the stator(s).

The generator further comprises a source of pressurized fluid communicating with each bearing unit. The body of each bearing unit directs the fluid, which is received from the source of pressurized fluid, towards the rotor, i.e. towards the open end of the body. Thereby fluid is constantly present at the interfaces between the rotor and the bearing units. The interfaces are formed by the open ends of the bodies of the bearing units. Accordingly, a fluid film is formed, and this fluid film provides a bearing effect allowing the rotor to rotate relative to the stator(s) with substantially no friction between the rotor and the stator(s) since the fluid film prevents direct contact between the rotor and the stator(s). Furthermore, the fluid film allows for compensation of fluctuations or variations occurring in the air gap between the rotor and the flux-generating modules. Thus, the fluid film helps maintaining the required air gap between the rotor and each flux-generating module.

Each stator may comprise a first flux-generating module and a second flux-generating module arranged on opposing sides of the rotor. According to this embodiment, at least one set of flux-generating modules is arranged opposite to each other with the rotor rotating in a channel formed between the flux-generating modules. An air gap is formed between the rotor and the first flux-generating module, as well as between the rotor and the second flux-generating module.

Each stator may comprise a first bearing unit and a second bearing unit arranged on opposing sides of the rotor. According to this embodiment, the rotor is confronted by fluid bearings from two sides. This allows the position of the rotor relative to the flux-generating modules, and thereby the air gap defined between the rotor and the flux-generating modules, to be controlled very accurately. As an alternative, the rotor may be supported by bearing units from one side only, i.e. bearing units may be arranged solely along one side of the rotor.

The body of each bearing unit may further comprise a sliding surface at least partially surrounding the open end of the cavity and facing the rotor. The sliding surface is preferably made from or coated with a material providing a low friction between the rotor and the sliding surface. The pressure of the fluid supplied to the bearing units may be sufficient to maintain the air gap without the bodies of the bearing units contacting the rotor, except under extreme loads or deflections. Alternatively, the bearing units may be configured to operate with the sliding surfaces in contact with the rotor at all times. Either way, the sliding surface is designed in a manner which introduces a minimal friction between the rotor and the bearing unit, thereby inhibiting the rotational movements of the rotor as little as possible.

The source of pressurized fluid may be configured to supply a gaseous fluid, such as atmospheric air. A gaseous fluid can easily leave the open end of the body of a bearing unit and flow towards other parts of the generator without causing damage, and without requiring recollection of the fluid. This is an advantage because using gaseous fluid thereby reduces the requirements for sealing of the bearing units.

However, it should be noted that the present invention does not rule out that the source of pressurized fluid may be configured to supply a liquid fluid, provided that the bearing units are designed appropriately to collect the liquid after it has been supplied to the open ends of the bodies of the bearing units.

Each bearing unit may further comprise a nozzle portion coupled to the body, the nozzle portion comprising a passage configured to receive pressurized fluid from the fluid source and direct it to the cavity of the body. According to this embodiment, the nozzle portion is arranged fluidly between the source of pressurized fluid and the cavity of the body. The nozzle portion 'sprays' the fluid towards and into the cavity, in particular towards the open end facing the rotor.

For at least one bearing unit, the nozzle portion or the coupling between the nozzle portion and the body may define a flow restricting portion. According to this embodiment, the pressure of the pressurized fluid is increased when it reaches the flow restricting portion, and subsequently decreased significantly when it enters the cavity of the body of the bearing unit. This makes it possible to control the fluid pressure in the cavity in such a manner that a desired bearing effect is obtained at the open end facing the rotor, and in such a manner that a desired air gap is maintained between the rotor and the flux-generating modules.

The body of at least one bearing unit may be pivotally connected to the associated nozzle portion. This allows the body to perform relative movements with respect to the nozzle portion, via the pivot connection. Thereby the open end facing the rotor is allowed to pivot slightly relative to the rotor. This also helps in maintaining a uniform and constant air gap between the rotor and the flux-generating modules.

The cavity defined by the body of at least one bearing unit may have a cross sectional area which increases along a direction towards the rotor. Due to the increased cross sectional area, the pressure of the pressurized fluid decreases along the direction towards the rotor. Thus, the pressure of the fluid is lowest at the open end facing the rotor. This may, e.g., be obtained if the cavity defined by the body of at least one bearing unit has a substantially conical shape.

The generator may comprise at least two stators arranged along separate angular segments of the rotor. According to this embodiment, the stators are arranged in such a manner that only part of the rotor is arranged adjacent to a stator at any given time, i.e. the stators do not occupy the entire periphery defined by the rotor.

The separate angular segments are preferably distributed substantially uniformly along the periphery defined by the rotor, and the stators preferably occupy angular segments of substantially equal size. For instance, the generator may comprise two stators arranged substantially opposite to each other, e.g. each occupying an angular segment of approximately 60°. As an alternative, the generator may comprise three stators arranged with approximately 120° between neighbouring stator segments, or the generator may comprise any other suitable or desirable number of stators.

As an alternative, the generator may comprise a single stator arranged along the entire periphery of the rotor, i.e. the stator extending along 360°. As another alternative, a single stator may extend along a smaller angular part of the periphery defined by the rotor.

The generator may be an axial flux generator with an air gap between the flux-generating modules and the rotor extending substantially parallel to the rotational axis of the rotor. Thereby the flux lines generated as the rotor moves past the flux-generating modules also extend substantially parallel to the rotational axis of the rotor. Accordingly, the forces acting between the rotor and the stators also extend substantially parallel to the rotational axis of the rotor, thereby minimising forces acting substantially perpendicularly to the rotational axis. This reduces the loads introduced in the generator.

Alternatively, the generator may be a radial flux generator with an air gap between the flux-generating modules and the rotor extending substantially perpendicular to the rotational axis of the rotor.

According to a second aspect the invention provides a wind turbine comprising at least one generator according to the first aspect of the invention.

It should be noted that a person skilled in the art would readily recognise that any feature described in combination with the first aspect could also be combined with the second aspect, and vice versa.

The wind turbine may comprise two generators according to the first aspect of the invention, the rotors of said generators being mounted on a common rotational shaft. According to this embodiment, the generators may, e.g., be mounted on opposite sides of a tower construction carrying the generators. Thereby the power production of the wind turbine can be significantly increased, possibly doubled, as compared to a wind turbine comprising only one generator.

The rotor(s) of the generator(s) may be connected to a set of wind turbine blades, i.e. the rotational movements of the rotor(s) may be a result of the wind acting on the wind turbine blades.

The wind turbine may be a horizontal axis wind turbine, i.e. it may be of a kind having a set of wind turbine blades mounted on or connected to a main axle arranged rotationally, and extending along a substantially horizontal direction.

As an alternative, the wind turbine may be a vertical axis wind turbine, i.e. it may be of a kind having a set of wind turbine blades mounted on or connected to a main axle arranged rotationally, and extending along a substantially vertical direction.

The generator may be a direct drive generator, also referred to as a gearless generator. According to this embodiment, the rotor is driven directly by the wind turbine blades, i.e. the wind acting on the wind turbine blades directly provides the relative movements between the rotor and the stators without the use of a gear stage. As an alternative, the wind turbine may comprise a gear system arranged between the wind turbine blades and the rotor of the generator. The gear system normally increases the rotational speed, i.e. the rotational speed of an input shaft of the generator is higher than the rotational speed of a main axle coupled to and driven by the wind turbine blades.

BRIEF DESCRIPTION OF THE DRAWINGS

The invention will now be described in further detail with reference to the accompanying drawings in which.

DETAILED DESCRIPTION OF THE DRAWINGS

Figure 1:
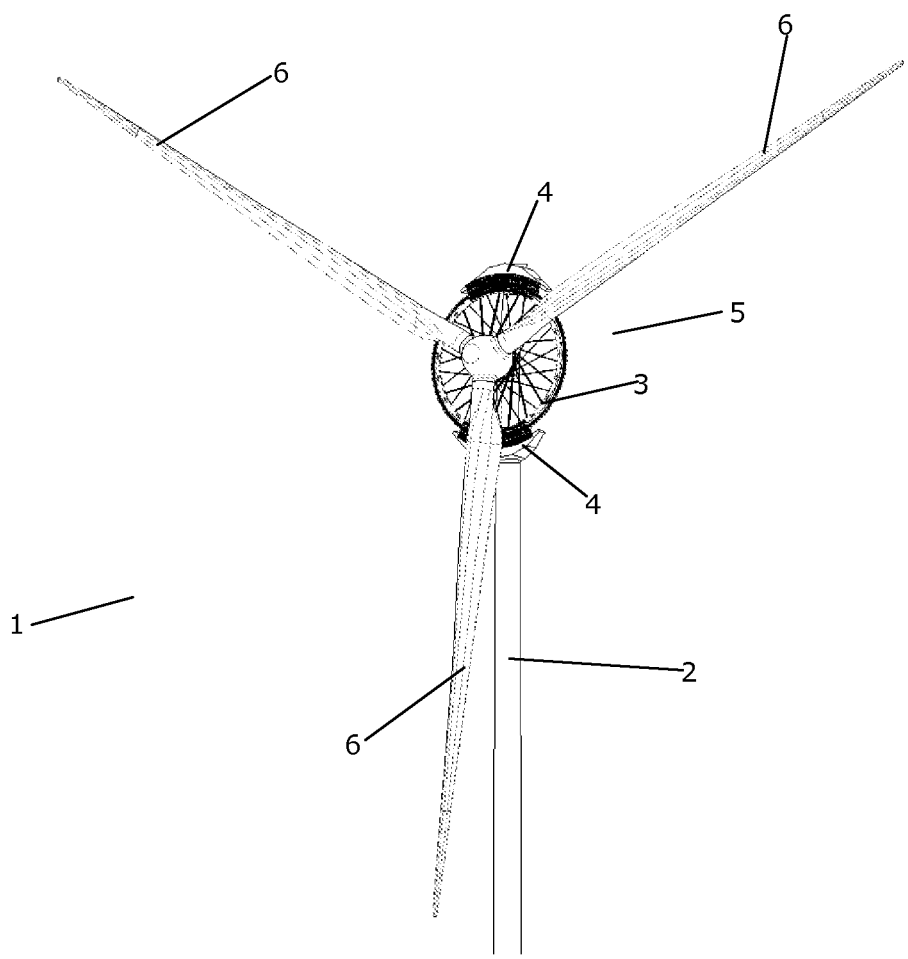
FIG. 1 is a perspective view of a wind turbine according to an embodiment of the invention.

FIG. 1 is a perspective view of a wind turbine 1 according to an embodiment of the invention. The wind turbine 1 comprises a wind turbine tower 2 having a rotor 3 and two stators 4 mounted thereon, the rotor 3 and the stators 4 forming part of a generator 5. Three wind turbine blades 6 are mounted on the rotor 3 in such a manner that the rotor 3 rotates relative to the stators 4 due to the wind acting on the wind turbine blades 6.

The wind turbine 1 is a direct drive wind turbine, i.e. the rotor 3 of the generator 5 is driven directly by the wind turbine blades 6 without a gear stage to increase rotational speeds.

The stators 4 are arranged substantially opposite to each other, each occupying an angular segment of approximately 60° along a periphery defined by the rotor 3. Although only two stators 4 are shown, an additional number of stators may be included in alternative embodiments.

Figure 2:
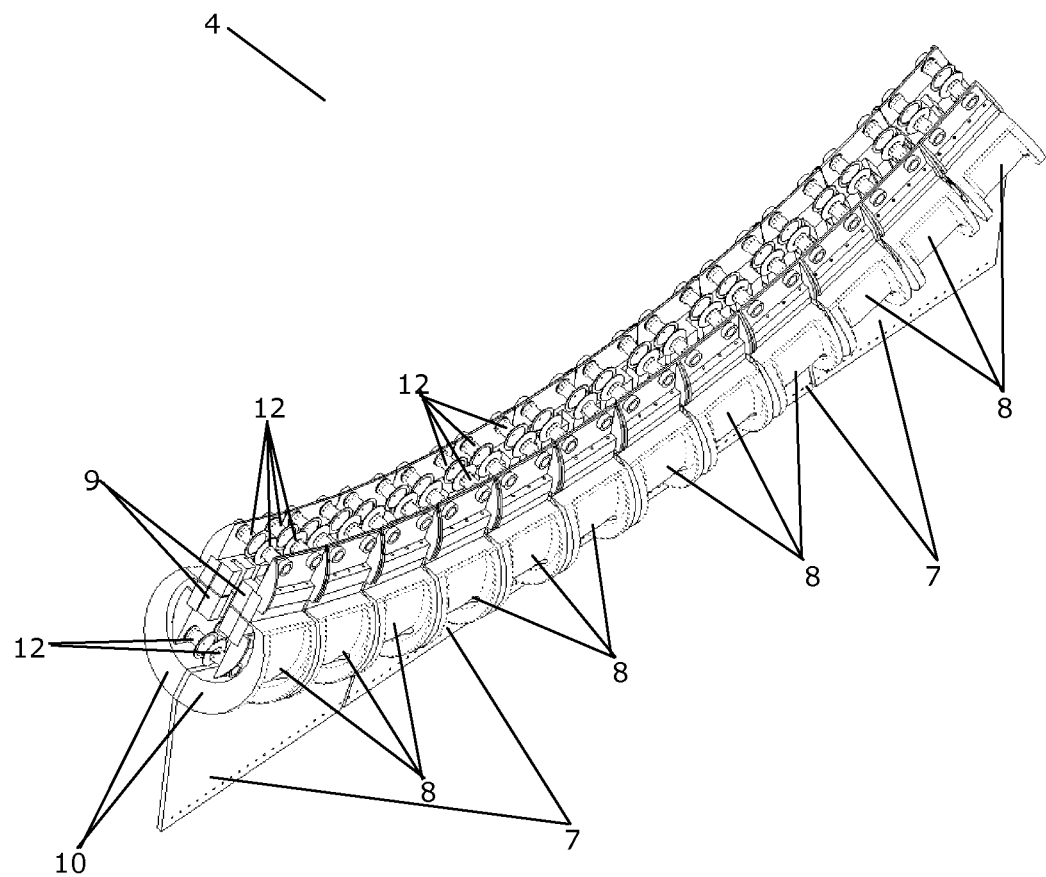
FIG. 2 is a perspective view of a stator of a generator according to an embodiment of the invention.

FIG. 2 is a perspective view of a stator 4 of a generator according to an embodiment of the invention. The stator 4 comprises four stator frames 7, each having three subunits 8 mounted thereon, the subunits 8 being arranged side-by-side. Each subunit 8 comprises two flux-generating modules 9 arranged opposite to and spaced from each other, thereby defining a passage there between, through which a rotor (not shown) can pass during normal operation of the generator. The rotor carries permanent magnets, electromagnets, or some other active material or component designed to interact with the flux-generating modules 9 to generate electric current. Specifically, an air gap is maintained between the rotor and each flux-generating module 9. As the active material of the rotor moves past the flux-generating modules 9, flux moves through the air gap. This moving flux induces a current in windings mounted near the flux-generating modules 9.

The flux-generating modules 9 are each mounted on a stator support part 10, and for each subunit 8, two stator support parts 10 are connected to each other via a hinge connection 11, thereby allowing the stator support parts 10 and flux-generating modules 9 mounted thereon to be moved relative to each other via the hinge connection 11. This will be described in further detail below with reference to FIG. 3.

The subunits 8 are mounted on the stator frame 7 in such a manner that they are movable relative to each other along a direction which is substantially transverse to the direction of movement of the rotor during normal operation of the generator, i.e. in a direction towards or away from the passage defined between the flux-generating modules 9. Thus, in the case that small irregularities are present in the rotor (e.g., due to deflections, machine tolerances, etc.), or other variations in the air gaps between the rotor and the flux-generating modules 9 occur, such irregularities or variations can be compensated by one subunit 8 moving slightly relative to a neighbouring subunit 8, without affecting the neighbouring subunit 8. This helps in maintaining a uniform and substantially constant air gap between the rotor 3 and each of the flux-generating modules 9. The transverse movements of the subunits 8 are provided passively due to inherent properties, such as material properties, geometric design, etc., of the stator frames 7 and/or the stator support parts 10. The stator frames 7 and the stator support parts 10 in combination form or form part of a stator support structure.

Each subunit 8 is further provided with eight bearing units 12 in the form of air bearings. It should be noted that the number and location of the bearing units 12 may vary. In FIG. 2, the bearing units 12 of each subunit 8 are arranged above and below the flux-generating modules 9. These will be described in further detail below.

The stator frames 7 and/or the stator support parts 10 may define a preloaded spring force acting against magnetic forces occurring between the rotor and the flux-generating modules 9 during operation of the generator. In this case the preloaded spring force counteracts most of the fluctuations in the air gap, and the bearing units 12 only have to deal with 'extreme' loads, thereby helping in maintaining a uniform and constant air gap.

Figure 3:
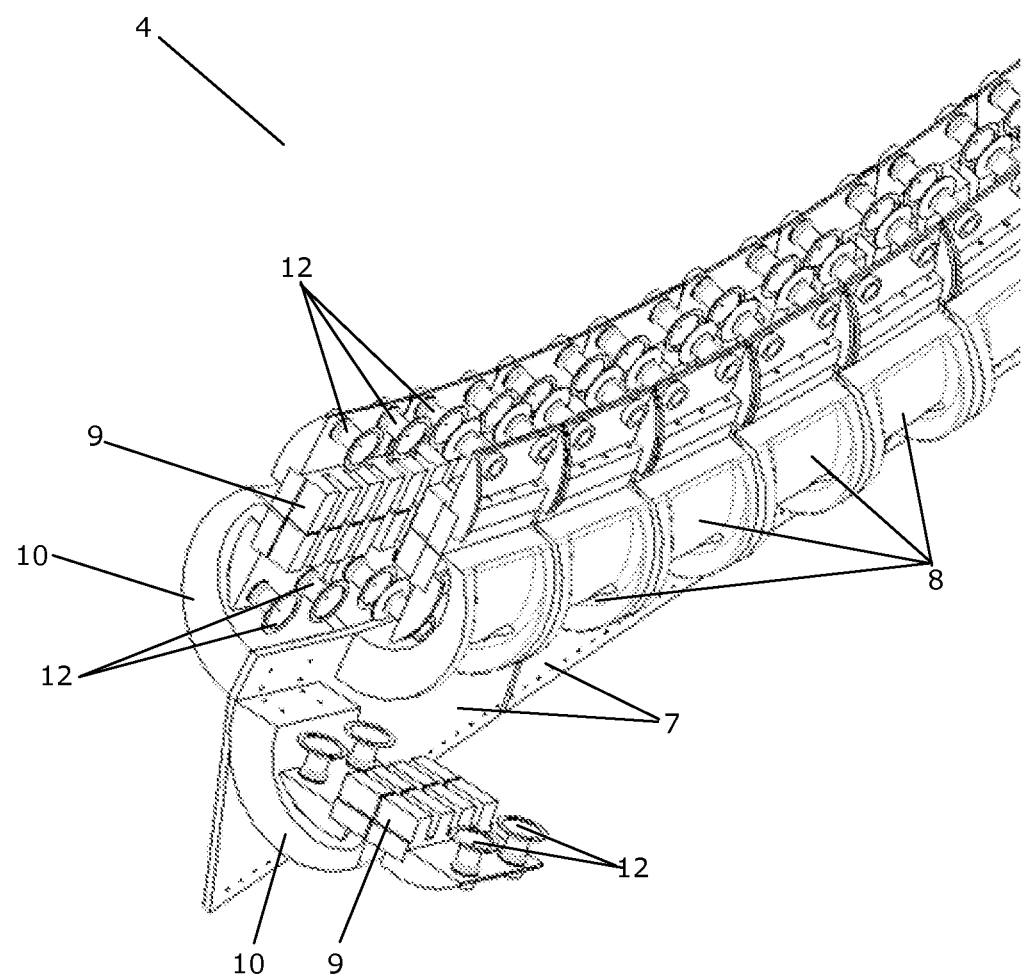
FIG. 3 shows a detail of the stator of FIG. 2.

FIG. 3 shows the stator 4 of FIG. 2 in further detail. In FIG. 3 one of the stator support parts 10 of one of the subunits 8 has been moved relative to the other stator support part 10 of that subunit 8, via the hinge connection 11. Thus, one of the stator support parts 10, and thereby the flux-generating modules 9 mounted thereon, has been rotated away from the passage through which the rotor passes during normal operation of the generator. Thereby it is possible to gain access to a region between the rotor and the flux-generating modules 9. This allows service to be easily performed on parts in this region of the generator, e.g. on the flux-generating modules 9, the bearing units 12 and/or the rotor. A method for performing service on a generator comprising the stator 4 of FIGS. 2 and 3 may be performed in the following manner. Initially, one of the stator support parts 10 ("first" stator support part) is fixated independent of the other stator support part 10 in the same sub-unit 8 ("second" stator support part), e.g. by attaching the stator support part 10 to a neighbouring subunit 8, thereby preventing the stator support part 10 from moving via the hinge connection 11. Then a bolt connection (not shown) between the two stator support parts 10 of the subunit 8 is released, thereby allowing relative movement between the stator support parts 10. Subsequently, the second stator support part 10, along with the flux-generating module 9 mounted thereon, is moved via the hinge connection 11 to the position shown in FIG. 3. At this point it is possible to perform maintenance or service on the generator in the region between the rotor and the flux-generating modules 9, as described above. When the service has been completed, the second stator support part 10 is returned to the operating position shown in FIG. 2, via the hinge connection 11. The bolt connection between the stator support parts 10 is then re-established, and the fixation of the first stator support part 10 is released. Then the generator is once again ready for normal operation.

Figure 4:
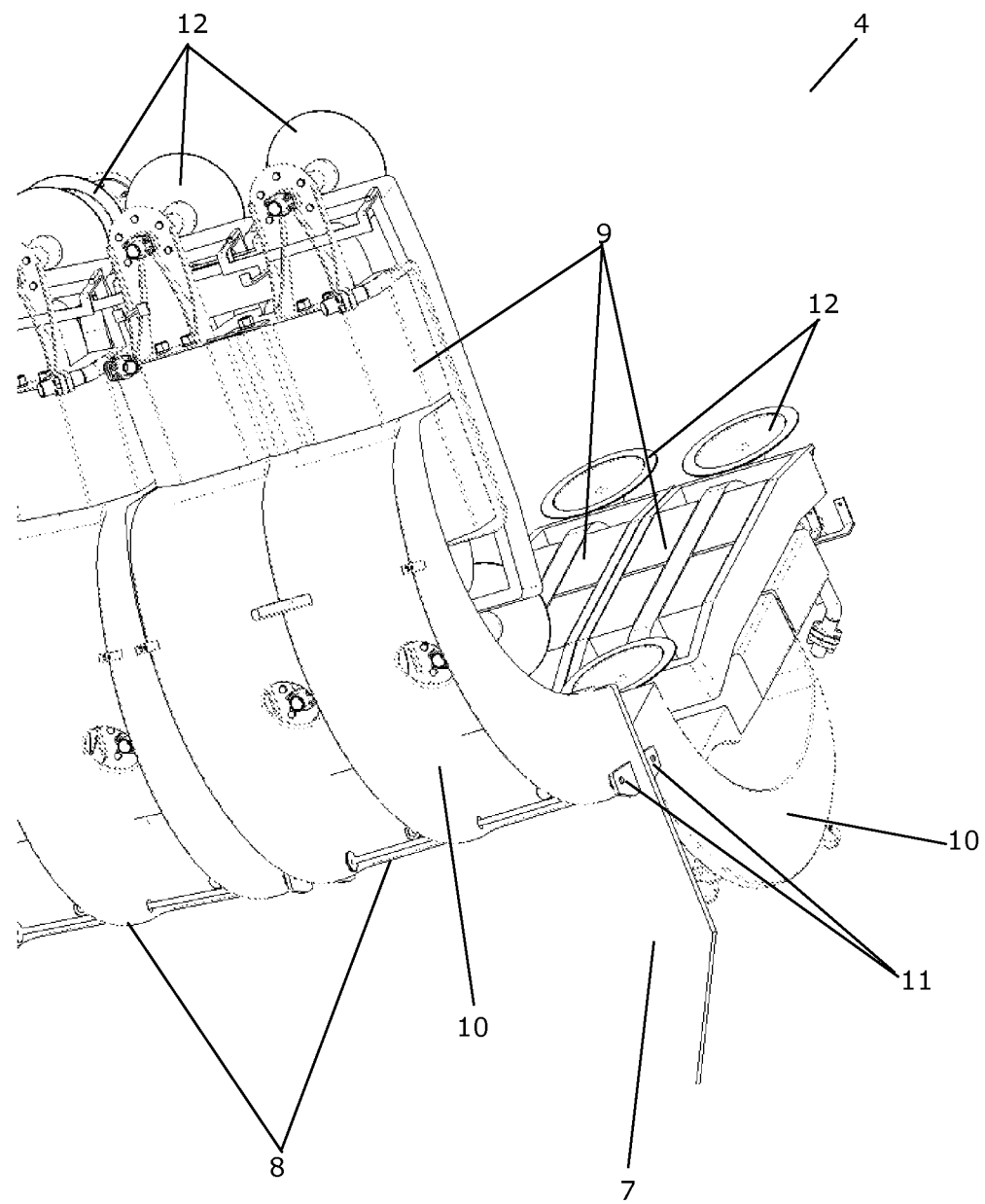
FIG. 4 shows another detail of the stator of FIG. 2.

FIG. 4 shows another detail of the stator 4 of FIG. 2. In FIG. 4 the hinge connection 11 is visible.

Figure 5:
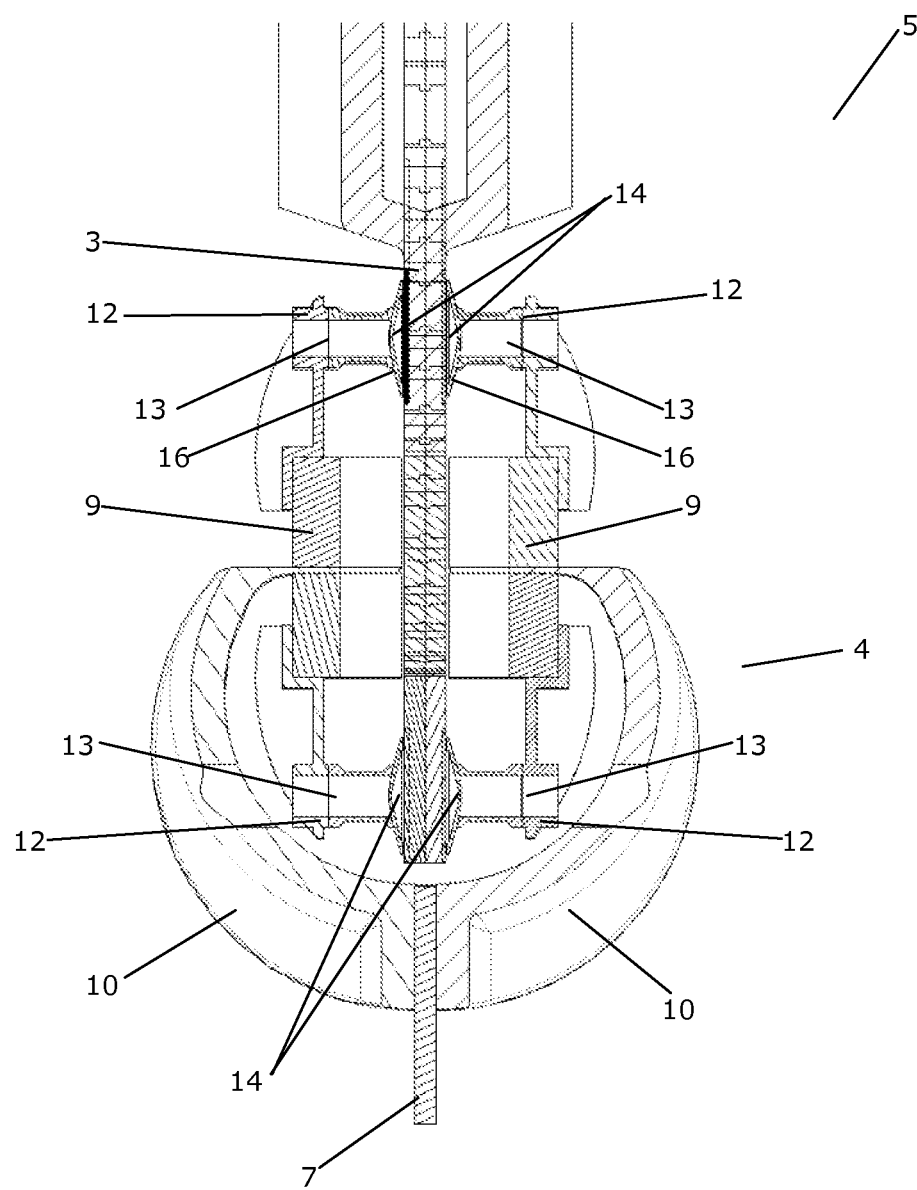
FIG. 5 is a cross sectional view of a generator comprising the stator of FIG. 2.

FIG. 5 is a cross sectional view of a generator 5 comprising the stator 4 of FIG. 2. In FIG. 5 the rotor 3 is arranged in the passage defined between the flux-generating modules 9 of the stator 4. It is also clear from FIG. 5 that the air gap defined between the rotor 3 and the flux-generating modules 9 is very small.

In FIG. 5 the shape of the stator support parts 10 can be clearly seen. Each stator support part 10 has a curved shape. The material thickness is greatest at the position where the stator support parts 10 are mounted on the stator frame 7, and decreases gradually along the curved shape in a direction away from the mounting point. Thereby the stator support parts 10 are more flexible at a position close to the flux-generating modules 9 than at a position close to the stator frame 7. Furthermore, the curved shape is designed in a manner which minimises strain introduced in the stator support part 10 during operation of the generator. The shape of the stator support part 10 is carefully selected in such a manner that a preloaded spring force is provided which acts against magnetic forces occurring between the rotor and the flux-generating modules 9. More particularly, the magnetic forces occurring between the rotor 3 and the flux-generating modules 9 will tend to pull the flux-generating modules 9 towards the rotor 3. The shape of the stator support part 10 is designed in such a manner that this is automatically and passively counteracted by the stator support part 10.

The flux-generating modules 9 are mounted on the stator support parts 10 in such a manner that a contact point between a stator support part 10 and the corresponding flux-generating module 9 is positioned substantially halfway between an upper edge and a lower edge of the flux-generating module 9, i.e. approximately in a centre region of the flux-generating module 9. Furthermore, the shape of the stator support part 10 near this contact point is designed in such a manner that forces transferred between the stator support part 10 and the flux-generating module 9 are transferred along a direction which is substantially perpendicular to a radial direction defined by the rotor 3, as well as to the moving direction of the rotor 3. Thereby it is obtained that forces transferred between the stator support part 10 and the flux-generating module 9 will not tend to 'tilt' the flux-generating module 9, which might otherwise create a variation in the size of the air gap defined between the rotor 3 and the flux-generating module 9 along the radial direction. Instead it is ensured that the entire flux-generating module 9 is moved substantially along a direction towards or away from the rotor 3, thereby ensuring a uniform air gap between the rotor 3 and the flux-generating modules 9.

Four bearing units 12 are visible in FIG. 5. Each bearing unit 12 includes a body 16 defining a cavity 14 with an open end facing the rotor 3. A source of pressurized fluid (not shown) is connected to each bearing unit 12, whose bodies 16 direct the fluid against the rotor 3 thereby creating a fluid film between the cavities 14 and the rotor 3. The fluid film helps in maintaining a uniform air gap between the active material of the rotor 3 and the flux-generating modules 9. In the bearing units 12 shown in FIGS. 2-5, the cavity 14 of each bearing unit 12 is fixedly connected to a fluid passage 13 guiding pressurized fluid from the source of pressurized fluid to the cavity 14.

Figure 6:
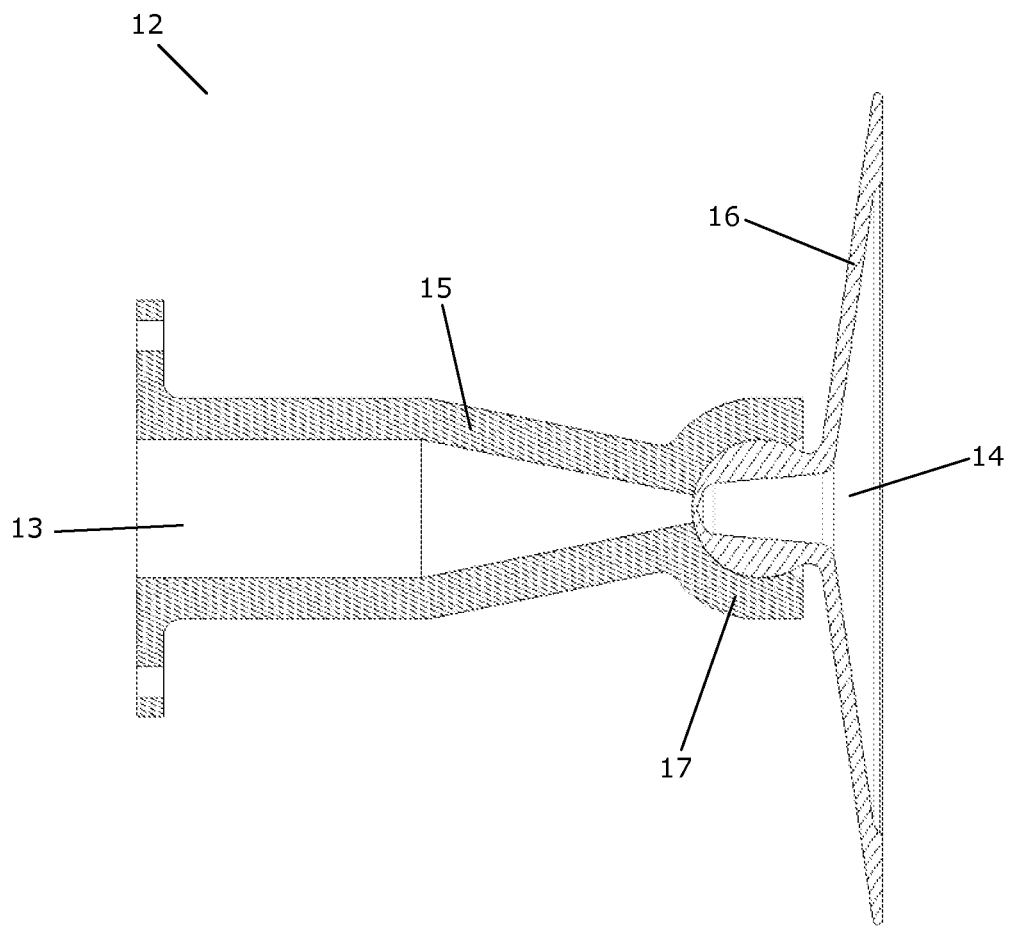
FIG. 6 is a cross sectional view of a bearing unit for use in a generator according to an embodiment of the invention.

FIG. 6 is a cross sectional view of a bearing unit 12 for use in a generator according to an alternative embodiment of the invention. The bearing unit 12 shown in FIG. 6 differs from the bearing units 12 shown in FIGS. 2-5. It should, however, be noted that the bearing unit 12 shown in FIG. 6 could also be used in the generator shown in FIGS. 2-5. Similar reference numbers are used to refer to corresponding elements.

The bearing unit 12 of FIG. 6 comprises a nozzle portion 15 defining a fluid passage 13 which is connectable to a source of pressurized fluid (not shown). The bearing unit 12 further comprises a body 16 defining a cavity 14, the cavity 14 having an open end which is adapted to be arranged in such a manner that it faces a rotor. The body 16 is pivotally connected to the nozzle portion 15 via a pivot connection 17. This allows the body 16 to perform pivotal movements relative to the nozzle portion 15.

The bearing unit 12 of FIG. 6 operates in the following manner. Pressurized fluid is received in the fluid passage 13 of the nozzle portion 15 and guided towards the pivot connection 17 and into the cavity 14 of the body 16. At the pivot connection 17 the fluid passage is very narrow, and the fluid flow is therefore restricted at this point. Accordingly, the pressure of the fluid is increased significantly when it reaches the pivot connection 17. The body 16 has a substantially conical shape towards the open end. Thus, the cross sectional area of the body 16 increases along a direction towards the open end. Accordingly, the pressure of the fluid decreases as it moves along this direction inside the cavity 14.

When the fluid reaches the open end of the cavity 14 a fluid film is formed at the open end. When the bearing unit 12 is mounted on a stator and arranged adjacent to a rotor as described above, the fluid film forms a bearing surface towards the rotor, and it helps in maintaining a substantially uniform and constant air gap between the rotor and the stator, as described above. The periphery of the body 16 forms a sliding surface, preferably having a low friction surface facing the rotor 3, as described above.

The invention claimed is:

1. A generator for a wind turbine, the generator comprising:
    a rotor configured to rotate about a rotational axis,
    at least one stator arranged next to the rotor, each stator comprising at least one flux-generating module facing the rotor but spaced therefrom, thereby forming an air gap between the rotor and the at least one flux-generating module, and at least one bearing unit, the at least one bearing unit comprising a body defining a cavity with an open end facing the rotor, and
    a source of pressurized fluid communicating with the at least one bearing unit, wherein the body of the at least one bearing unit directs the fluid towards the rotor to help maintain the air gap between the rotor and the at least one flux-generating module,
    wherein the at least one bearing unit further comprises a first bearing unit and a second bearing unit respectively arranged above and below the at least one flux-generating module.

2. The generator according to claim 1, wherein the at least one flux-generating module comprises a first flux-generating module and a second flux-generating module arranged on opposing sides of the rotor.

3. The generator according to claim 1, wherein the body of each bearing unit further comprises a sliding surface at least partially surrounding the open end of the cavity and facing the rotor.

4. The generator according to claim 1, wherein each bearing unit further comprises a nozzle portion coupled to the body, the nozzle portion comprising a passage configured to receive pressurized fluid from the fluid source and direct it to the cavity of the body.

5. The generator according to claim 4, wherein, for at least one bearing unit, the nozzle portion or the coupling between the nozzle portion and the body defines a flow restricting portion.

6. The generator according to claim 4, wherein the body of at least one bearing unit is pivotally connected to the associated nozzle portion.

7. The generator according to claim 1, wherein the cavity defined by the body of at least one bearing unit has a cross sectional area which increases along a direction towards the rotor.

8. The generator according to claim 7, wherein the cavity defined by the body of at least one bearing unit has a substantially conical shape.

9. The generator according to claim 1, wherein the generator comprises at least two stators arranged along separate angular segments of the rotor.

10. The generator according to claim 1, wherein the generator is an axial flux generator, an air gap between the flux-generating modules and the rotor extending substantially parallel to the rotational axis of the rotor.

11. A wind turbine comprising at least one generator according to claim 1.

12. The wind turbine according to claim 11, comprising two generators, the rotors of said generators being mounted on a common rotational shaft.

13. The wind turbine according to claim 11, wherein the rotor of the generator is connected to a set of wind turbine blades.

14. The wind turbine according to claim 11, the wind turbine being a horizontal axis wind turbine.

15. The wind turbine according to claim 11, wherein the generator is a direct drive generator.

16. The generator according to claim 1, wherein the body of each bearing unit directs the fluid towards the rotor in a direction substantially parallel to a rotational axis of the rotor.

17. The generator according to claim 1, wherein the source of pressurized fluid is configured to supply a gaseous fluid.

* * * * *